United States Patent [19]
Gavin

[11] 4,170,221
[45] Oct. 9, 1979

[54] SOLAR HEAT COLLECTOR CONSTRUCTION

[75] Inventor: Joseph G. Gavin, Huntington, N.Y.

[73] Assignee: Grumman Corporation, Bethpage, N.Y.

[21] Appl. No.: 869,719

[22] Filed: Jan. 16, 1978

Related U.S. Application Data

[62] Division of Ser. No. 750,580, Dec. 15, 1976, Pat. No. 4,086,913.

[51] Int. Cl.² .............................................. F24J 3/02
[52] U.S. Cl. .................................... 126/446; 165/171; 165/173; 52/763
[58] Field of Search ............... 126/270, 271; 237/1 A; 165/171, 173; 29/157.3 C, 157.3 D; 52/496, 761, 762, 763

[56] References Cited

U.S. PATENT DOCUMENTS

| | | | |
|---|---|---|---|
| 2,736,406 | 2/1956 | Johnson | 165/171 |
| 2,795,402 | 6/1957 | Modine | 29/157.3 D |
| 2,799,481 | 7/1957 | Becker | 165/171 |
| 3,384,167 | 5/1968 | Javkin | 165/171 |
| 3,972,317 | 8/1976 | Gallagher | 165/171 |
| 4,011,856 | 3/1977 | Gallagher | 126/271 |
| 4,034,802 | 7/1977 | Schwarz | 165/171 |
| 4,064,866 | 12/1977 | Knight, Jr. | 165/171 |
| 4,069,811 | 1/1978 | Tabor | 165/171 |
| 4,084,579 | 4/1978 | Yu | 126/271 |

*Primary Examiner*—Henry C. Yuen
*Attorney, Agent, or Firm*—Richard G. Geib; Mellor A. Gill

[57] ABSTRACT

A solar heat collector having an array of liquid transporting tubes and a plurality of heat absorber panels joined by a tube gripping accommodation on each panel providing structural integrity and good thermal conductivity.

1 Claim, 4 Drawing Figures

SOLAR HEAT COLLECTOR CONSTRUCTION

This is a division of application Ser. No. 750,580 filed Dec. 15, 1976 now U.S. Pat. No. 4,086,913.

FIELD OF INVENTION

The present invention relates to solar heat collectors and specifically to a novel and improved means for constructing solar heat collector absorber panels.

DESCRIPTION OF PRIOR ART

Many solar heat collectors employ tubes of copper or other metals to convey heat transport liquid (See Assignee's co-pending patent application Ser. No. 648,258 filed Jan. 12, 1976 now U.S. Pat. No. 4,059,093) which is heated by contact with the tube walls. The tubes in turn receive their heat from a flat plate, generally blackened, which is heated by the sun's rays. The connections between the plate and the tubes have been in many cases the cause of losses in performance, due to high thermal resistance associated with simple mechanical attachment. This problem has caused many designers to resort to soldering, brazing or welding the plates to the tubes in order to achieve a more perfect thermal union. But these forms of attachment are costly, especially when the plate and the tubes are of dissimilar metals, such as aluminum plates and copper tubes. Yet, aluminum is desirable as a plate material because of its low cost and high thermal conductivity, while copper is desirable as a tube material owing to its relative freedom from corrosion when used with untreated water.

SUMMARY

The present invention overcomes the objections previously raised against mechanical attachment of aluminum plates to copper tubes, and realizes all of the advantages of that union. It is a type of metal plate (hereinafter referred to as a finplank) such as can be produced by the extrusion process, so shaped that it will fit between any two tubes in an array of evenly-spaced parallel tubes and will lock with the adjacent finplanks to tightly grip the tubes and hence provide a good thermal connection.

It is, therefore, a primary object of the invention to provide finplanks which can be attached mechanically to an array of tubes by a locking means which grips the tubes tightly and thereby secures a good thermal connection.

Another object is to provide finplanks which can be attached quickly and easily to an array of tubes so as to provide a good thermal connection and which may be of a different metal than the tubes and which may use grease or other substance to further enhance the thermal connection.

BRIEF DESCRIPTION OF THE DRAWINGS

Other objects and advantages of the invention will become more apparent during the course of the following description when taken in connection with the accompanying drawings.

In the drawings, wherein like numerals are employed to designate like parts.

DESCRIPTION OF THE PREFERRED EMBODIMENT

Figure 1:
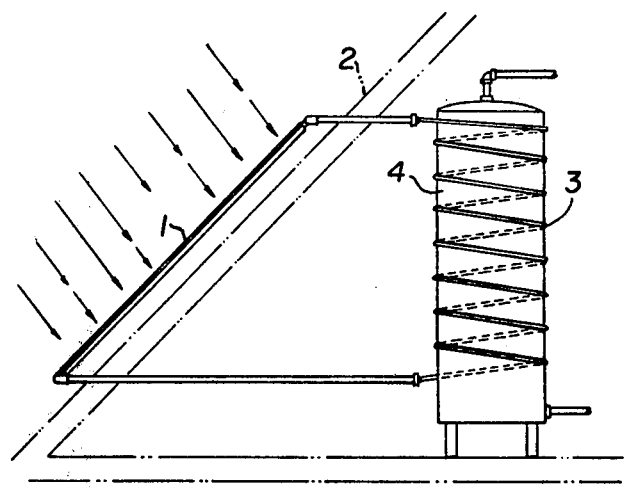
FIG. 1 is a schematic illustration of a use to which this invention may be put.

Referring to the drawings there is illustrated by FIG. 1 a solar collector assembly 1 according to this invention on roof 2 of a house for heating fluid in pipe heat exchanger 3 for a hot water tank 4.

Figure 2:
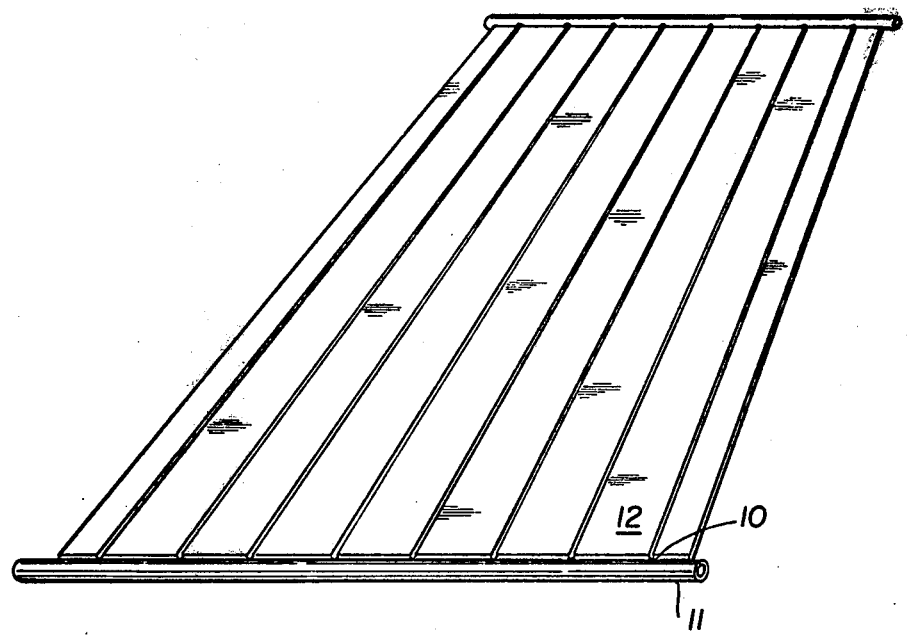
FIG. 2 is a three-quarter view of a solar heat collector absorber panel embodying the invention.
Figure 3:
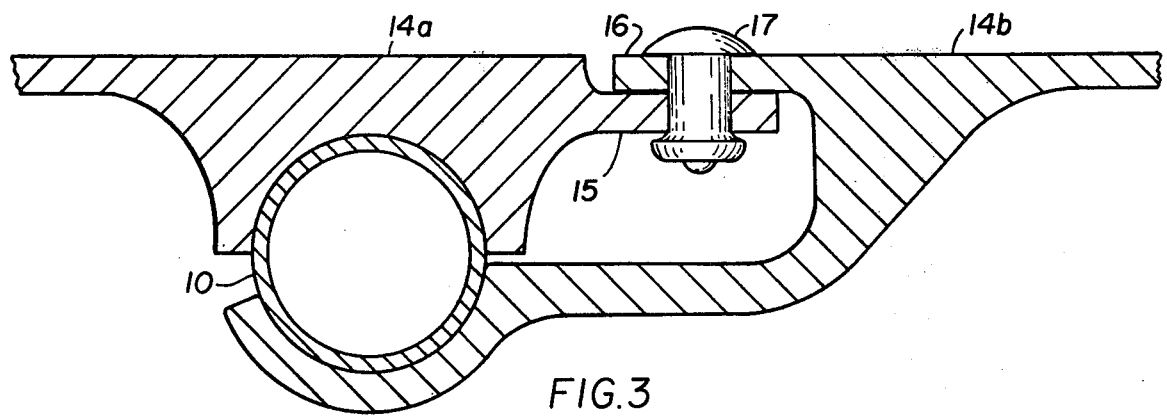
FIG. 3 is a cross-sectional view of a portion of the panel of FIG. 1.

The instant invention is more particularly illustrated in FIG. 2 where the solar heat collector absorber panel embodying the invention is there shown to include an array of evenly-spaced parallel tubes 10, joined to bottom header 11 to which are attached finplanks 12. In FIG. 3, a cross-sectional view of a portion of the solar collector panel is shown, consisting of finplanks 14a and 14b enclosing tube 10 and secured by rivet 17 through flanges 15 and 17. The flanges 15 and 16 have prepunched holes to accept the rivet 17 which is a blind rivet due to access from the top side only.

Figure 4:
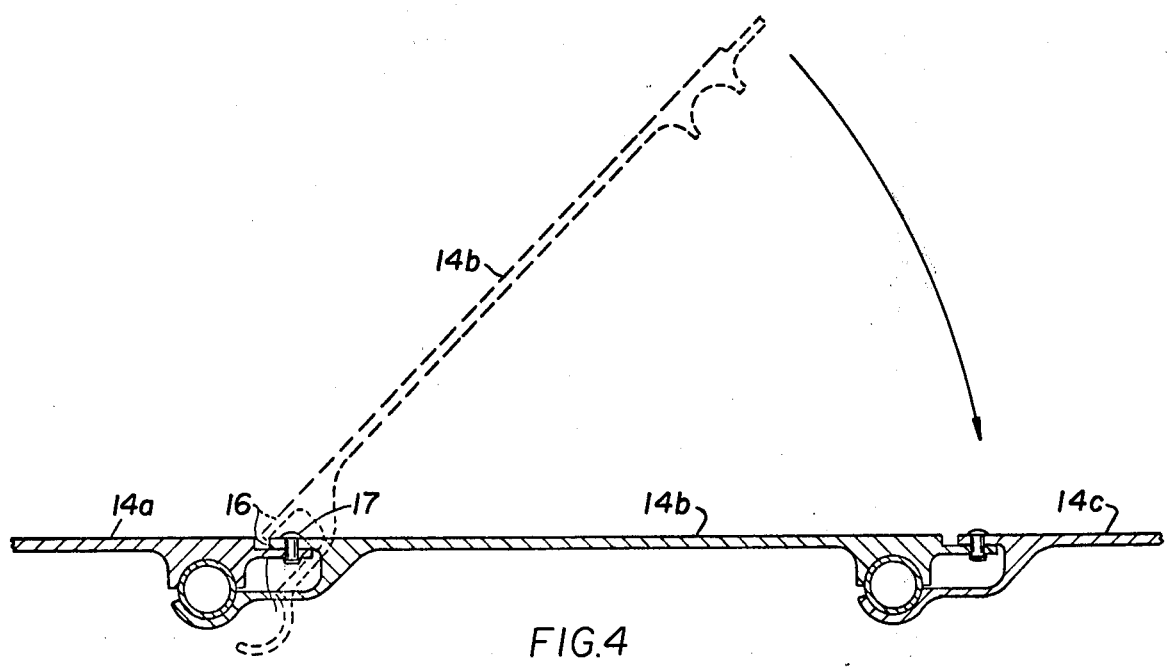
FIG. 4 is a view similar to FIG. 2 with the addition of an illustration showing method of attaching and locking a finplank to an adjacent one.

In assembling the solar collector panel, the parallel tubes are preassembled to headers. FIG. 4 illustrates how a finplank, 14b, is rotated into place around 14a prior to similar rotating assembly of 14c to enclose tubes 10 (see FIG. 3) and being secured by rivet 17. This is illustrative of a sequential assembly of finplanks on the tube array, starting with finplank 14a, then 14b, then 14c, etc., to develop the attached finplanks 12 of FIG. 2.

Having described an operative embodiment of this invention it is now desired to set forth the protection sought by these Letters Patent in the appended claims.

I claim:

1. A solar collector comprising:

an array of a plurality of spaced tubes for conducting heat exchange fluid;

means to collect energy and transfer same to said tubes, said means comprising finplanks each of which has a portion inwardly and exteriorly respectively of their mating edges contoured with one portion adapted to be placed about one side and an opposite portion adapted to be placed about an opposite side of the tubes when mating edges of one finplank with another finplank, said mating edges having flanges one of which is recessed below the surface of the one finplank and another of which is an extension of the surface of the another finplank each of which has prepunched holes that will align when their respective contoured portions of the finplank edges are encircling one of said tubes: and fastener means inserted through the aligned holes of said flanges to draw said finplank edges into compressive contact with said one of said tubes whereby said finplanks provide thermal conductivity to said one of said tubes.

* * * * *